United States Patent
Ding et al.

(10) Patent No.: US 11,573,583 B2
(45) Date of Patent: Feb. 7, 2023

(54) PRESSURE CONTROL USING AN EXTERNAL TRIGGER

(71) Applicant: MKS Instruments, Inc., Andover, MA (US)

(72) Inventors: Junhua Ding, Boxborough, MA (US); Mark J. Quaratiello, Atkinson, NH (US)

(73) Assignee: MKS INSTRUMENTS, INC., Andover, MA (US)

(*) Notice: Subject to any disclaimer, the term of this patent is extended or adjusted under 35 U.S.C. 154(b) by 0 days.

(21) Appl. No.: 17/452,953

(22) Filed: Oct. 29, 2021

(65) Prior Publication Data
US 2022/0147070 A1 May 12, 2022

Related U.S. Application Data

(60) Provisional application No. 63/110,818, filed on Nov. 6, 2020.

(51) Int. Cl.
*G05D 16/20* (2006.01)
*G01F 15/00* (2006.01)
*G05D 7/06* (2006.01)

(52) U.S. Cl.
CPC ....... *G05D 16/2033* (2013.01); *G01F 15/005* (2013.01); *G05D 7/0623* (2013.01); *G05D 7/0647* (2013.01); *Y10T 137/7761* (2015.04)

(58) Field of Classification Search
CPC ............... G05D 7/0623; G05D 7/0647; G05D 16/2033; G05D 16/2006; G05D 16/20; G01F 15/005; G01F 1/34; Y10T 137/7761

(Continued)

(56) References Cited

U.S. PATENT DOCUMENTS 3,552,428 A * 1/1971 Pemberton ........... G05D 7/0688
327/518
4,086,804 A * 5/1978 Ruby ................. G05D 16/2053
73/1.64

(Continued)

FOREIGN PATENT DOCUMENTS

JP 2019-070924 A 5/2019

OTHER PUBLICATIONS

International Search Report and Written Opinion for Int'l Application No. PCT/US2021/057399, titled: Pressure Control Using An External Trigger, dated Feb. 24. 2022.

*Primary Examiner* — William M McCalister

(74) *Attorney, Agent, or Firm* — Hamilton, Brook, Smith & Reynolds, P.C.

(57) ABSTRACT

A gas delivery system and associated method includes a flow channel, a control valve, a downstream pressure sensor, and a controller. The control valve controls flow of gas in the flow channel. The downstream pressure sensor, located downstream of the control valve, measures gas pressure in the flow channel. The controller has an external trigger input to receive a trigger signal applied to a shutoff valve downstream from the control valve. The controller operates in separate modes based on a state of the trigger signal. In a non-triggered mode, the controller controls pressure at the pressure sensor via the control valve in accordance with a first gain schedule. In the triggered mode, the controller controls the pressure at the pressure sensor via the control valve in accordance with a second gain schedule that is distinct from the first gain schedule.

24 Claims, 10 Drawing Sheets

(58) Field of Classification Search
USPC .................................................... 137/487.5
See application file for complete search history.

(56) References Cited

U.S. PATENT DOCUMENTS

| | | | | |
|---|---|---|---|---|
| 8,271,210 | B2* | 9/2012 | Chung | G01F 1/88 |
| | | | | 702/50 |
| 10,651,059 | B2 | 5/2020 | Lee | |
| 10,725,484 | B2 | 7/2020 | L'Bassi et al. | |
| 2002/0174898 | A1* | 11/2002 | Lowery | G05D 7/0635 |
| | | | | 137/487.5 |
| 2006/0278276 | A1* | 12/2006 | Tanaka | G05D 7/0635 |
| | | | | 137/487.5 |
| 2011/0108126 | A1* | 5/2011 | Monkowski | F16K 7/14 |
| | | | | 137/12 |
| 2014/0007950 | A1 | 1/2014 | Takijiri | |
| 2014/0041729 | A1* | 2/2014 | Lacouture | F01N 3/208 |
| | | | | 137/487.5 |
| 2014/0190571 | A1* | 7/2014 | Ding | G05D 7/0635 |
| | | | | 137/1 |
| 2014/0190579 | A1* | 7/2014 | Ding | G01F 15/005 |
| | | | | 137/487 |
| 2020/0073414 | A1 | 3/2020 | Lull et al. | |
| 2020/0081459 | A1* | 3/2020 | L'Bassi | G01F 15/001 |
| 2021/0405667 | A1* | 12/2021 | Ishii | G05D 7/0623 |
| 2022/0147070 | A1* | 5/2022 | Ding | G01F 15/005 |

\* cited by examiner

PRESSURE CONTROL USING AN EXTERNAL TRIGGER

RELATED APPLICATION

This application claims the benefit of U.S. Provisional Application No. 63/110,818, filed on Nov. 6, 2020. The entire teachings of the above application are incorporated herein by reference.

BACKGROUND

A pressure controller is a device to measure and control the pressure of gases. In general, a pressure controller includes an inlet port, an outlet port, a pressure sensor and a control valve that is adjusted to achieve a desired pressure of gas at the pressure sensor.

Semiconductor fabrication processes, such as atomic layer deposition (ALD) processes, can involve the delivery of several different gases and gas mixtures in various quantities over several processing steps. Generally, gases are stored in tanks at a processing facility, and gas metering systems are used to deliver metered quantities of gases from the tanks to processing tools, such as chemical vapor deposition reactors, vacuum sputtering machines, plasma etchers, etc. Typically, pressure controllers are included among other components in a flow path from a gas metering system to a processing tool.

Pulse gas delivery devices have been developed to deliver a pulsed flow of a gas to semiconductor process tools.

SUMMARY

Example embodiments include a gas delivery system comprising a flow channel, a control valve, a downstream pressure sensor, and a control unit. The control valve may be configured to control flow of gas in the flow channel. The downstream pressure sensor, located downstream of the control valve, may be configured to measure gas pressure in the flow channel. The control unit may have an external trigger input configured to receive a trigger signal applied to a shutoff valve downstream from the control valve, and may be configured for separate modes of operation based on a state of the trigger signal. The modes of operation may include a non-triggered mode and a triggered mode. In the non-triggered mode, the control unit may be configured to control pressure at the pressure sensor via the control valve in accordance with a first gain schedule. In the triggered mode, the control unit may be configured to control the pressure at the pressure sensor via the control valve in accordance with a second gain schedule that is distinct from the first gain schedule.

The trigger input may include a trigger pressure sensor configured to determine the state of the trigger signal based on pressure at the trigger input. The trigger input may tap a pneumatic line that opens and closes the shutoff valve, and the trigger pressure sensor may sense pressure at the pneumatic line. The trigger input may tap the pneumatic line between a pneumatic control valve and the shutoff valve. Alternatively, the trigger pressure sensor may receive the trigger signal via a pneumatic line controlled by a host controller.

The trigger signal may be an electrical signal indicating an open or close state of the shutoff valve. Each of the first and second gain schedules may have gain parameters including at least one of a proportional control gain, an integral control gain, and a derivative control gain. The control unit, in the triggered and non-triggered modes, may control pressure at the downstream pressure sensor based on a comparison of the measured pressure against a setpoint pressure.

A host controller may be configured to control the shutoff valve to deliver a pulse of gas flow through the flow channel. The triggered mode may correspond to delivery of the pulse of gas flow, while the non-triggered mode may correspond to an absence of the delivery of the pulse of gas flow.

Further embodiments include a method of gas delivery. A control valve configured to control flow of gas in a flow channel and a downstream pressure sensor, downstream of the control valve, configured to measure gas pressure in the flow channel, may be provided. With a control unit having an external trigger input configured to receive a trigger signal applied to a shutoff valve downstream from the control valve, gas flow through the control valve may be controlled in separate modes of operation based on a state of the trigger signal. In a non-triggered mode, pressure at the pressure sensor may be controlled via the control valve in accordance with a first gain schedule. In a triggered mode, the pressure at the pressure sensor may be controlled via the control valve in accordance with a second gain schedule that is distinct from the first gain schedule.

The state of the trigger signal may be determined based on pressure at the trigger input. To make this determination, pressure may be sensed at a pneumatic line that opens and closes the shutoff valve. The trigger input taps the pneumatic line between a pneumatic control valve and the shutoff valve. Alternatively, the trigger signal may be received via a pneumatic line controlled by a host controller.

The trigger signal may be an electrical signal indicating an open or close state of the shutoff valve. Each of the first and second gain schedules has gain parameters including at least one of a proportional control gain, an integral control gain, and a derivative control gain. In the triggered and non-triggered modes, pressure at the downstream pressure sensor may be controlled based on a comparison of the measured pressure against a setpoint pressure.

The shutoff valve may be controlled to deliver a pulse of gas flow through the flow channel. The triggered mode may correspond to delivery of the pulse of gas flow, while the non-triggered mode may correspond to an absence of the delivery of the pulse of gas flow.

Further embodiments include a controller comprising, as an integrated assembly, a flow channel, a control valve, a downstream pressure sensor, and a control unit. The control valve may be configured to control flow of gas in the flow channel. The downstream pressure sensor, located downstream of the control valve, may be configured to measure gas pressure in the flow channel. The control unit may have an external trigger input configured to receive a trigger signal applied to a shutoff valve downstream from the control valve, and may be configured for separate modes of operation based on a state of the trigger signal. The modes of operation may include a non-triggered mode and a triggered mode. In the non-triggered mode, the control unit may be configured to control pressure at the pressure sensor via the control valve in accordance with a first gain schedule. In the triggered mode, the control unit may be configured to control the pressure at the pressure sensor via the control valve in accordance with a second gain schedule that is distinct from the first gain schedule.

BRIEF DESCRIPTION OF THE DRAWINGS

The foregoing will be apparent from the following more particular description of example embodiments, as illus

DETAILED DESCRIPTION

A description of example embodiments follows.

Figure 1:
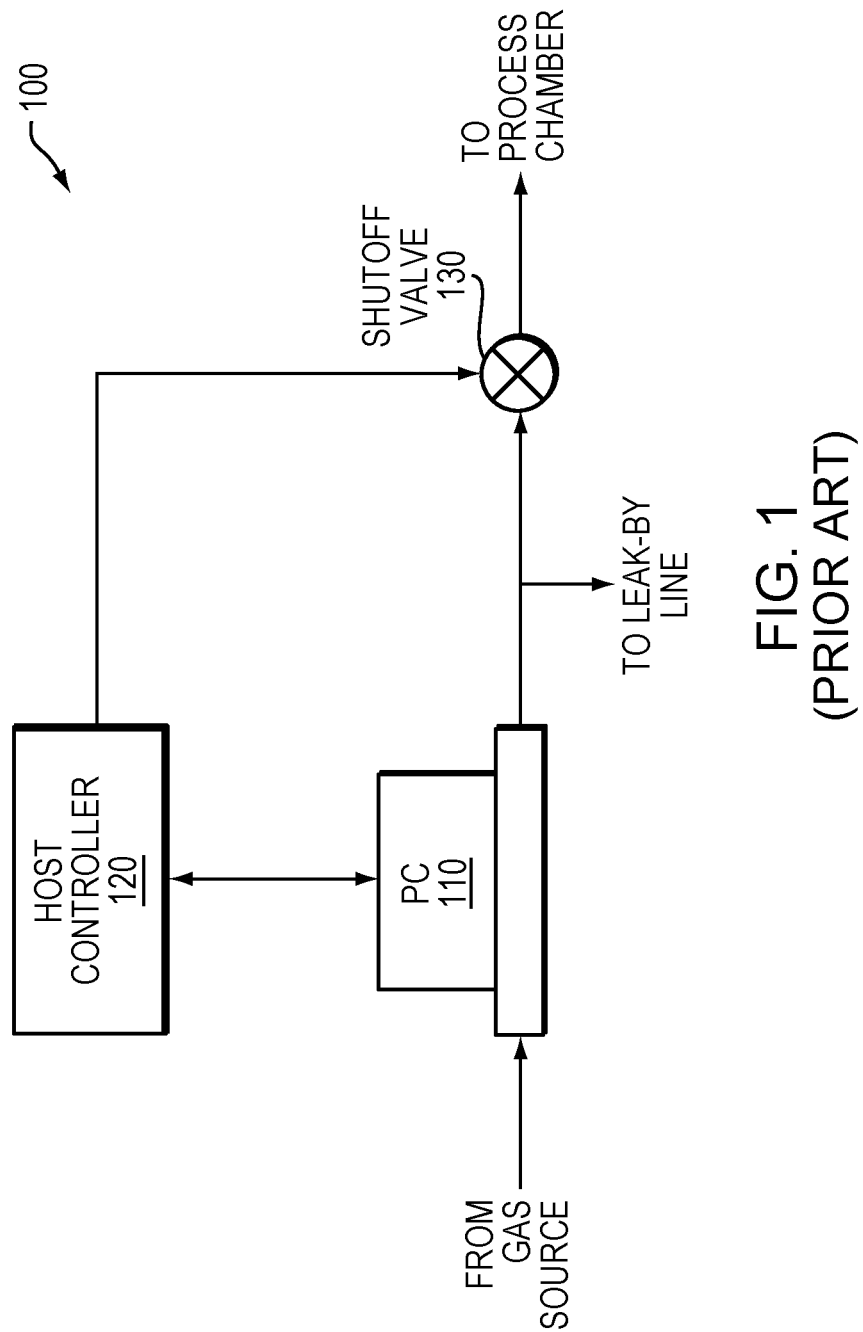
- FIG. 1 illustrates a prior gas delivery system using a pressure controller, a shutoff valve, and a leak-by line.

FIG. 1 illustrates a prior gas delivery system 100 using a pressure controller 110, a host controller 120, and a shutoff valve 130 connected to a leak-by line and a process chamber. A host controller 120 instructs the pressure controller 110 to provide a constant pressure of gas in the flow channel to the shutoff valve 130 and activates the shutoff valve 130 on and off to selectively enable the flow and hence deliver gas pulses to the process chamber. A drawback of pulse gas delivery systems such as system 100 is that the accuracy and the repeatability of pulse gas delivery are dependent on the pressure control quality of the pressure controller 110 as well as the response of shutoff valve 130. Further, the pressure controller 110 may not be able to control the pressure well for both the pulse on and pulse off periods as a result of rapid pressure changes at the flow channel maintained by the pressure controller 110.

Figure 2:
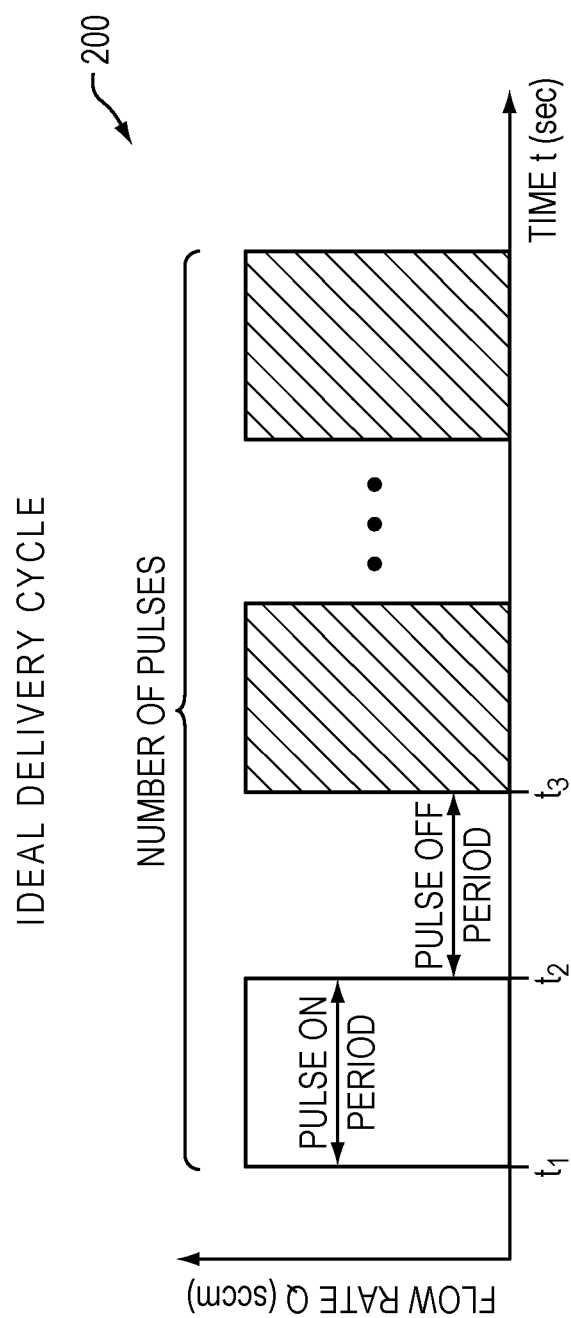
FIG. 2 is a graph illustrating pulse gas delivery.

FIG. 2 illustrates pulse delivery employing a gas dose defined by the product of ideal square shape flow set point (Q) and deliver time (Δt). A gas delivery cycle 200 can be specified by a 'pulse-on' period ($t_2-t_1$), a 'pulse-off' period ($t_3-t_2$), a gas dose (e.g., number of moles of gas per pulse), and a number of pulses per cycle. For pulse delivery, the gas dose can be defined as: ideal flow set point (Q)×deliver time ($\Delta t=t_2-t_1$).

A step function delivery of flow as illustrated in FIG. 2 is ideal but unrealistic due to actual sensor and valve time constants. For practical applications, accuracy and repeatability of dose in the required timeframe are the critical objectives. Thus, it is desirable to accurately and consistently deliver the gas. To this end, a pressure controller can be configured to maintain a desired pressure within a flow channel to assist in providing accurate gas delivery to a process chamber.

Figure 3A:
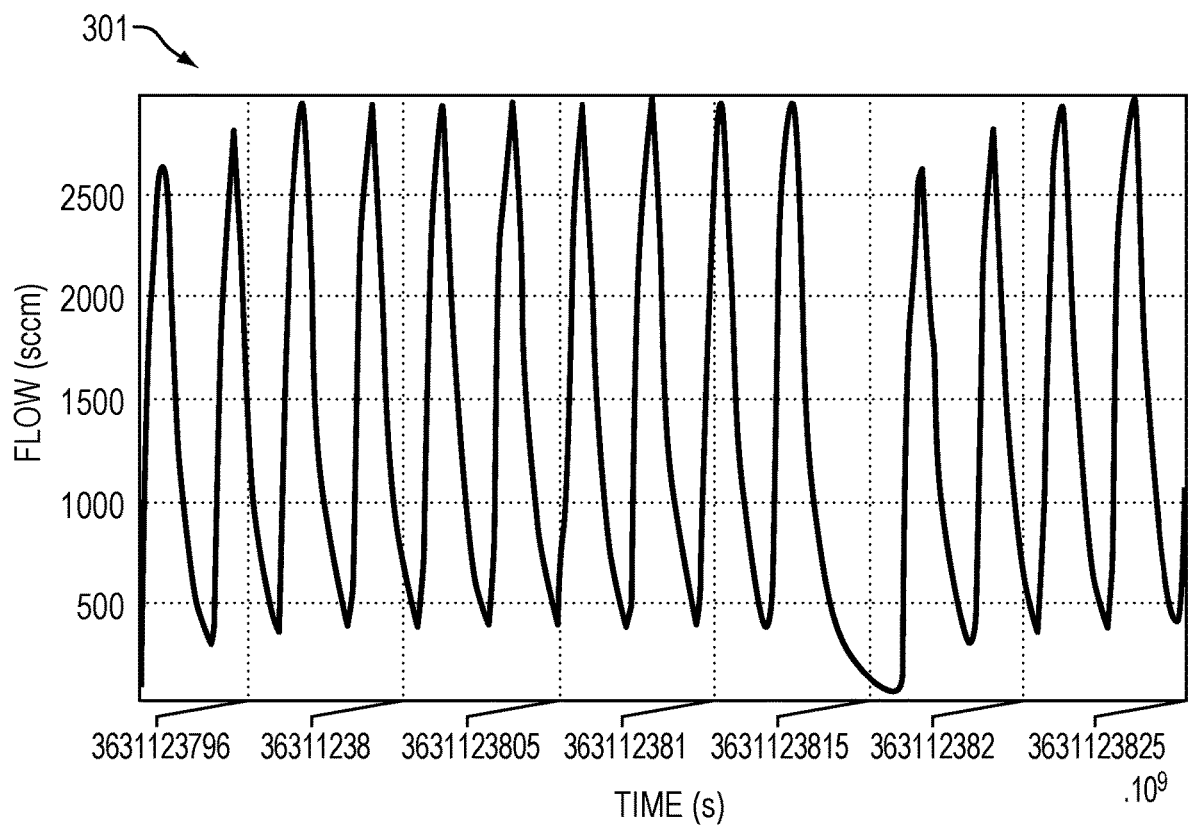
FIGS. 3A-B are graphs illustrating gas flow and pressure over time during pulse gas delivery.
Figure 3B:
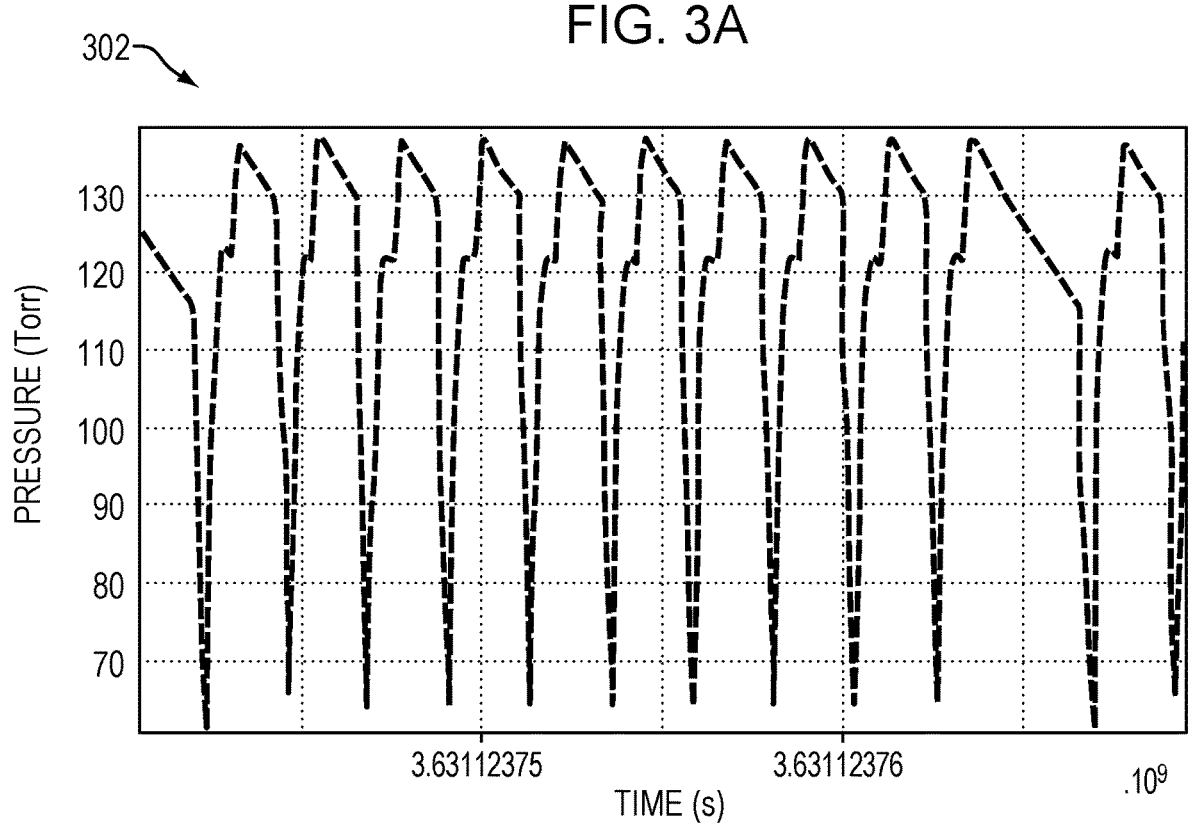

FIGS. 3A-B illustrate gas flow and pressure at a flow channel over time during a pulse gas delivery operation. FIG. 3A illustrates flow in standard cubic centimeters per minute (SCCM) 301, while FIG. 3B illustrates pressure in Torr 302. For pulse gas delivery applications, a pressure controller, such as the pressure controller described above with reference to FIG. 1, can be used to control the pressure at a flow channel upstream to a fast response, pneumatic shutoff valve commonly used in an atomic layer deposition (ALD) process (also termed "ALD valve"). The shutoff valve (a pneumatic valve) is turned on and off to deliver gas pulses while the pressure controller regulates the upstream pressure to a predetermined pressure set point. During delivery of a gas pulse, a consistent pressure at the flow channel is ideal. However, the pressure controller may not be able to control the pressure well for both the pulse on and pulse off periods during which the system exhibits different dynamics. As a result, as shown in FIGS. 3A and 3B, both the flow and pressure can fluctuate rapidly, which can result in inaccurate gas dose to the process chamber.

To address this problem, a gas delivery system in example embodiments, described below, implement a pressure controller configured to operate differently based on the state of the pulse operation. For example, the pressure controller can operate using multiple gain schedules, including one schedule for disturbance rejection when the shutoff valve is open for delivering the gas pulse, and another schedule for steady-state control when the shutoff valve is closed. Further, the pressure controller can be configured to switch between the multiple gain schedules in response to an external trigger that indicates the state of the shutoff valve. Such a configuration can improve the performance of the gas delivery system, as it enables the pressure controller to operate a gain schedule that is optimized for the given phase of the pulse delivery, and it enables the pressure controller to respond rapidly to the transitions between the phases of the pulse delivery. A further advantage is that existing gas delivery systems using a pressure controller can be retrofit to provide such an improvement using minimal additional components.

Figure 4A:
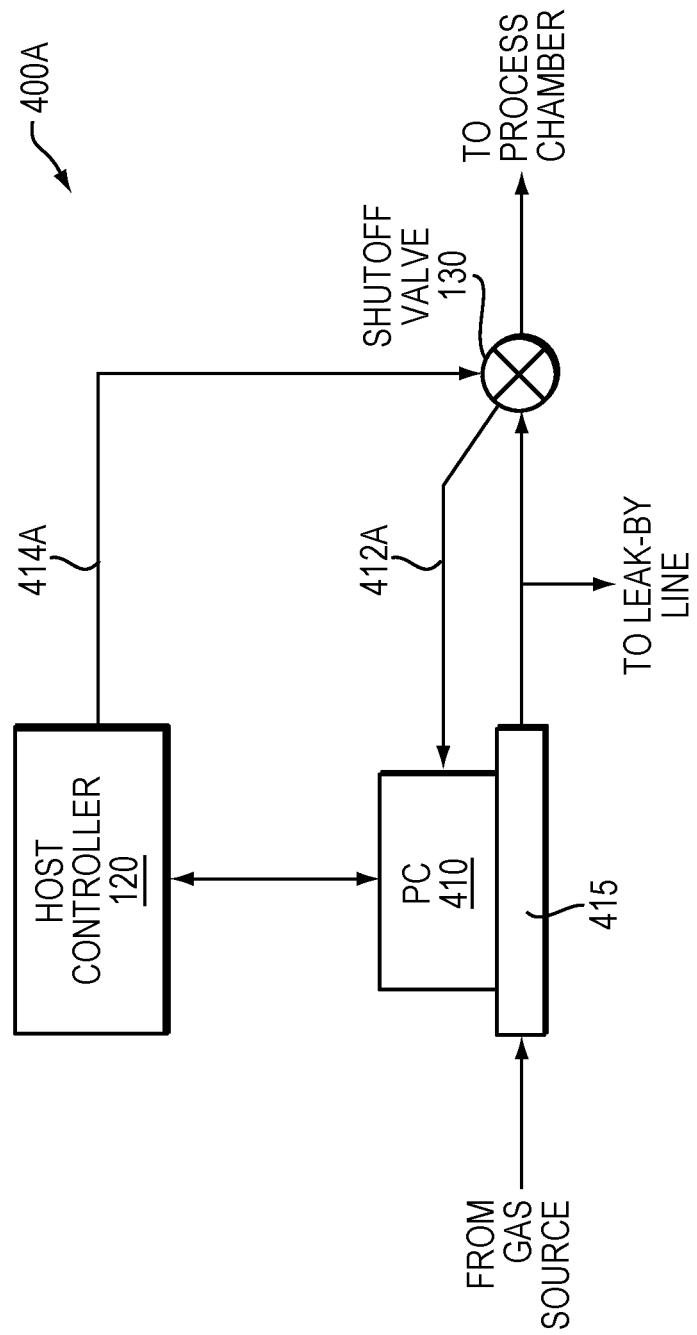
FIG. 4A is a schematic illustration of a gas delivery system including a pressure controller having a trigger input from a downstream shutoff valve.

FIG. 4A is a schematic illustration of a gas delivery system 400A including a pressure controller having a trigger input from a downstream shutoff valve. The system 400A includes pressure controller 410 with an external trigger input 412A from a downstream shutoff valve 130. The shutoff valve 130 can be a fast response, pneumatic shutoff valve such as an ALD valve. The pressure controller 410 controls flow of gas from a gas source through a flow channel 415 to the shutoff valve 130. The valve input 412A from the shutoff valve 130 can indicate the open or closed state of the shutoff valve 130. In the open state, fluid flow may be permitted from the gas source, through the shutoff valve 130 outlet, to the process chamber; the closed state prevents gas flow through the valve 130. A controller in the pressure controller 410 may be configured to respond to the valve input 412A to control the pressure of fluid at the flow channel 415 according to the state of the shutoff valve 130. Opening and closing of the shutoff valve 130 is controlled by host controller 120 via a control signal 414A to the valve 130. The control signal 414A can be an electrical control signal. Control of valve 130 may be via an intermediary control valve and a pneumatic control line, as for example illustrated in FIG. 4B. The pressure controller 410 communicates with a host controller 120 to coordinate the gas delivery process. For example, the pressure controller 410 may receive a pressure set point SP from the host controller 120 as described herein. The pressure controller 410 may also receive other values and instructions from the host control, such as the control gain schedules.

Figure 4B:
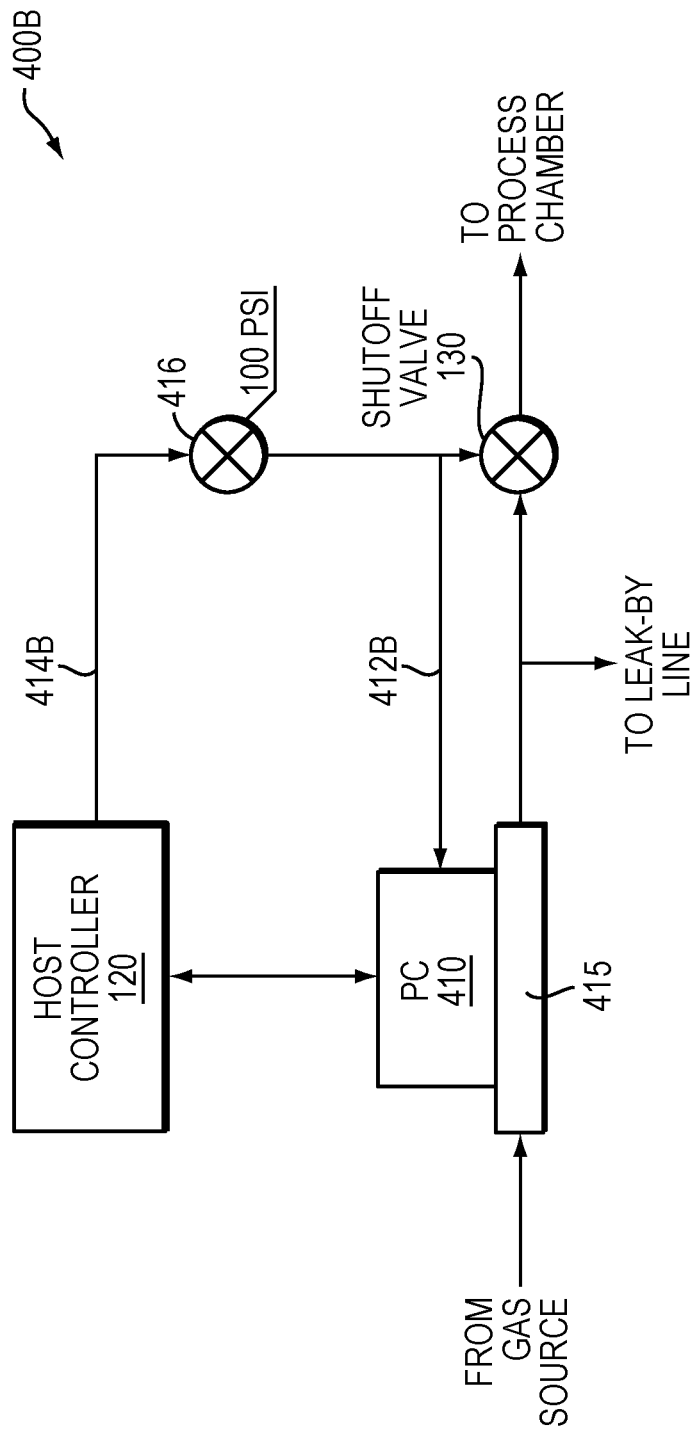
FIG. 4B is a schematic illustration of a gas delivery system including a pressure controller having a pressure signal input received via a tap into a pneumatic line to a downstream valve.

FIG. 4B is a schematic illustration of a gas delivery system 400B in a further embodiment. As in the system 400A, a pressure controller 410 is provided with a valve input, which in the system 400B is a pressure signal input 412B received via a tap into a pneumatic control line to the downstream shutoff valve 130. Pressure in the pneumatic control line opens and closes the downstream valve 130. In operation, the host controller 120 sends a control signal 414B to a pneumatic control valve 416 to trigger the pneumatic control valve to pass pressure, e.g., 100 PSI, to the downstream valve 130 for a duration of time. The duration of time may correspond to the desired pulse-on period for the delivery of the gas pulse. The host controller 120 may control a pneumatic distribution panel having a plurality of pneumatic control valves, e.g., 50-60 valves. In FIG. 4B, only one pneumatic control valve 416 is illustrated for simplicity, but it is understood that additional valves may be present as part of a pneumatic distribution panel.

Figure 4C:
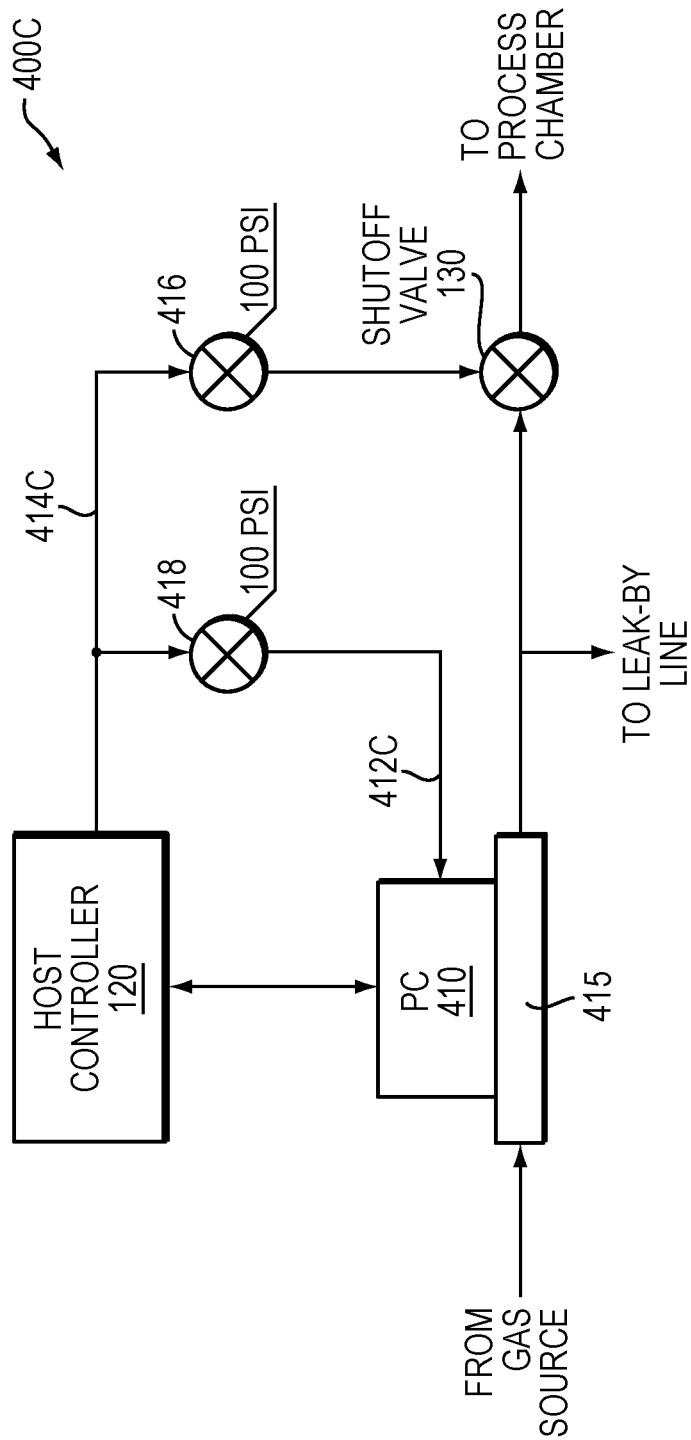
FIG. 4C is a schematic illustration of a gas delivery system including a pressure controller having a pressure signal input received via a pneumatic line controlled by a host controller.

FIG. 4C is a schematic illustration of a gas delivery system 400C in a still further embodiment. As in the system 400B, a host controller 120 controls opening and closing of the downstream valve 130, and the pressure controller 410 is provided with an external pressure signal input to trigger control gain scheduling. In the system 400C, the pressure controller 410 receives a pressure signal input 412C via a pneumatic line from a control valve 418 that is controlled by the host controller 120. A control signal 414C to pneumatic control valve 418 triggers the pneumatic control valve 418 to pass pressure, e.g., 100 PSI, to the pressure controller 410. A pressure sensor of the pressure controller 410 senses the pressure signal, which may trigger an adjustment to the pressure gain control by the pressure controller 410. The control signal 414C from the host controller 120 may also be transmitted to the pneumatic control valve 416 to trigger the pneumatic control valve 416 to pass pressure, e.g., 100 PSI, to the shutoff valve 130 to actuate the valve 130. The pneumatic control valves 416 and 418 can be controlled via one or more control signals (e.g., signal 414C) from the host controller. For example, valves 416 and 418 may be simultaneously controlled via a common control signal 414C. Alternatively, the host controller 120 may transmit different control signals to the valves 416 and 418 at different times. For example, the host controller 120 may transmit a control signal to the control valve 418 in advance of transmitting a control signal to the control valve 416, thereby giving advance notice to the pressure controller 410 of a change in state of the shutoff valve 130. Such a configuration may enable the pressure controller 410 to optimize timing of pressure gain adjustment relative to the opening and closing of the shutoff valve 130.

In addition to the embodiments illustrated in FIGS. 4A-4C, other ways to sense the state of the shutoff valve 130 can be implemented. For example, a position switch on the shutoff valve 130 may provide feedback of the state of the shutoff valve 130 to allow the pressure controller 410 to sense that the shutoff valve 130 is open.

Figure 5:
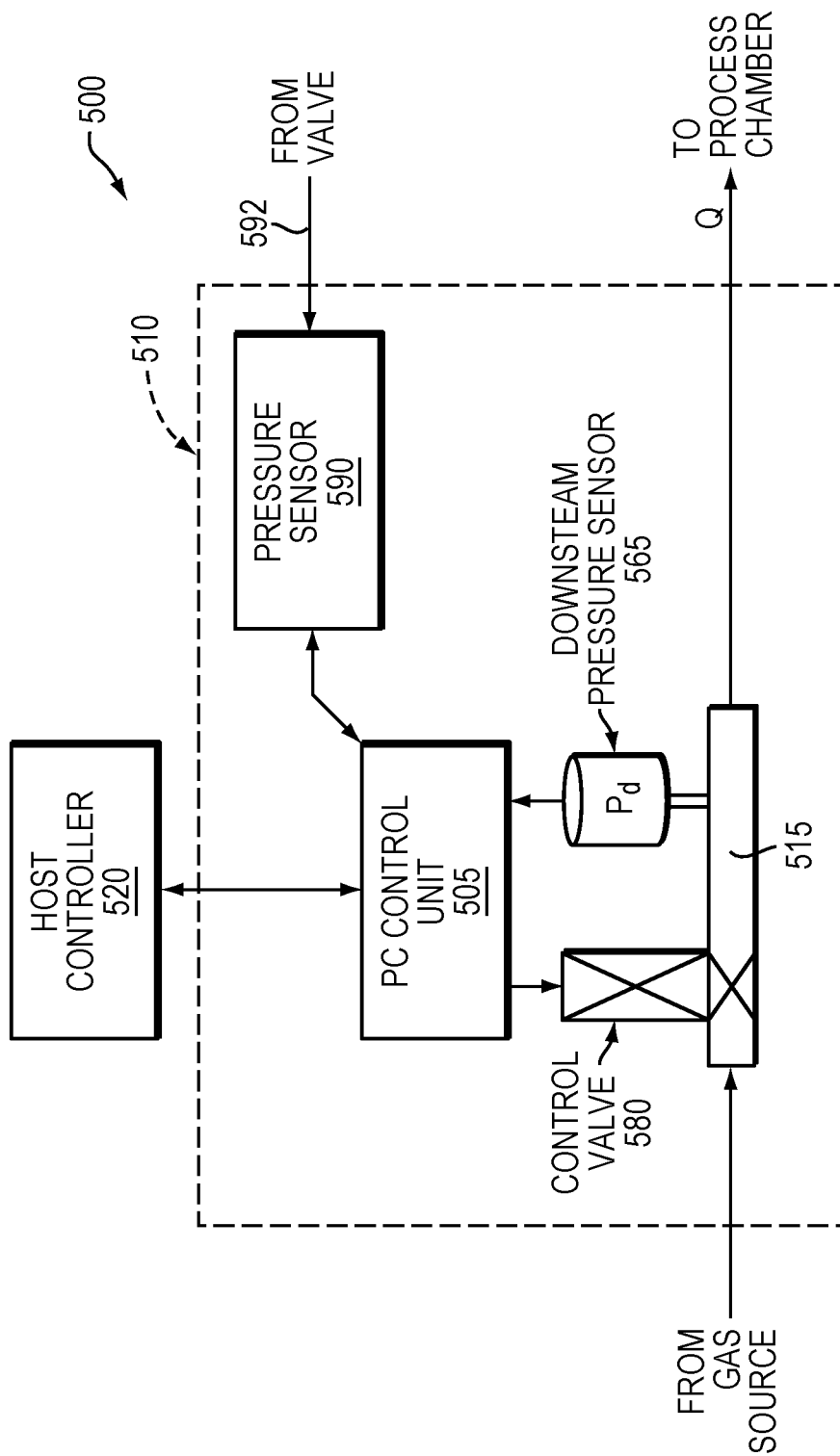
FIG. 5 is a schematic illustration of a pressure controller device including a pressure sensor to sense an external pressure signal.

FIG. 5 is a schematic illustration of an embodiment of a system 500 that includes a pressure controller 510 including a pressure sensor 590 (also referred to as a trigger pressure sensor) to sense an external pressure signal. The system 500 may be implemented in a gas delivery system such as the systems 400A-C described above. The pneumatic pressure change of the downstream shutoff valve (see FIGS. 4A, 4B) may be used to trigger a transition between modes of operation of the pressure controller 510. To enable this function, the pressure sensor 590 is implemented with the pressure controller 510, which is configured to detect the pneumatic control pressure change of the shutoff valve. The pressure sensor 590 can be built-in to the pressure controller 510 and operationally connected to an external trigger input of a control unit 505 to sense an external pressure signal that is received via a pneumatic line 592 feeding into the pressure controller 510. Alternatively, and in place of the pressure sensor 590 and pneumatic line 592, the control unit 505 may receive an electrical signal as the trigger signal to the trigger input, wherein the electrical signal may provide an indication of the state of the downstream shutoff valve. The pressure controller 510 may be configured to communicate with a host controller 520 to receive a pressure set point, gain schedule parameters, and/or other instructions.

The pressure controller 510 further includes a control valve 580 (e.g., a proportional control valve) to control flow of fluid from a gas source into a flow channel 515. The control valve 580 is an adjustable control valve distinct from a typical on/off isolation valve. The degree of openness of the control valve can be controlled to limit flow and enable control of the pressure within the flow channel 515. The control unit 505 may be an electronic microprocessor, and may be configured to control flow of fluid through the control valve 580 to control gas pressure within the flow channel 515. The control unit 505 controls the flow of fluid through the control valve 580 based on feedback from a downstream pressure sensor 565, which is provided to measure pressure in the flow channel 515.

Figure 7:
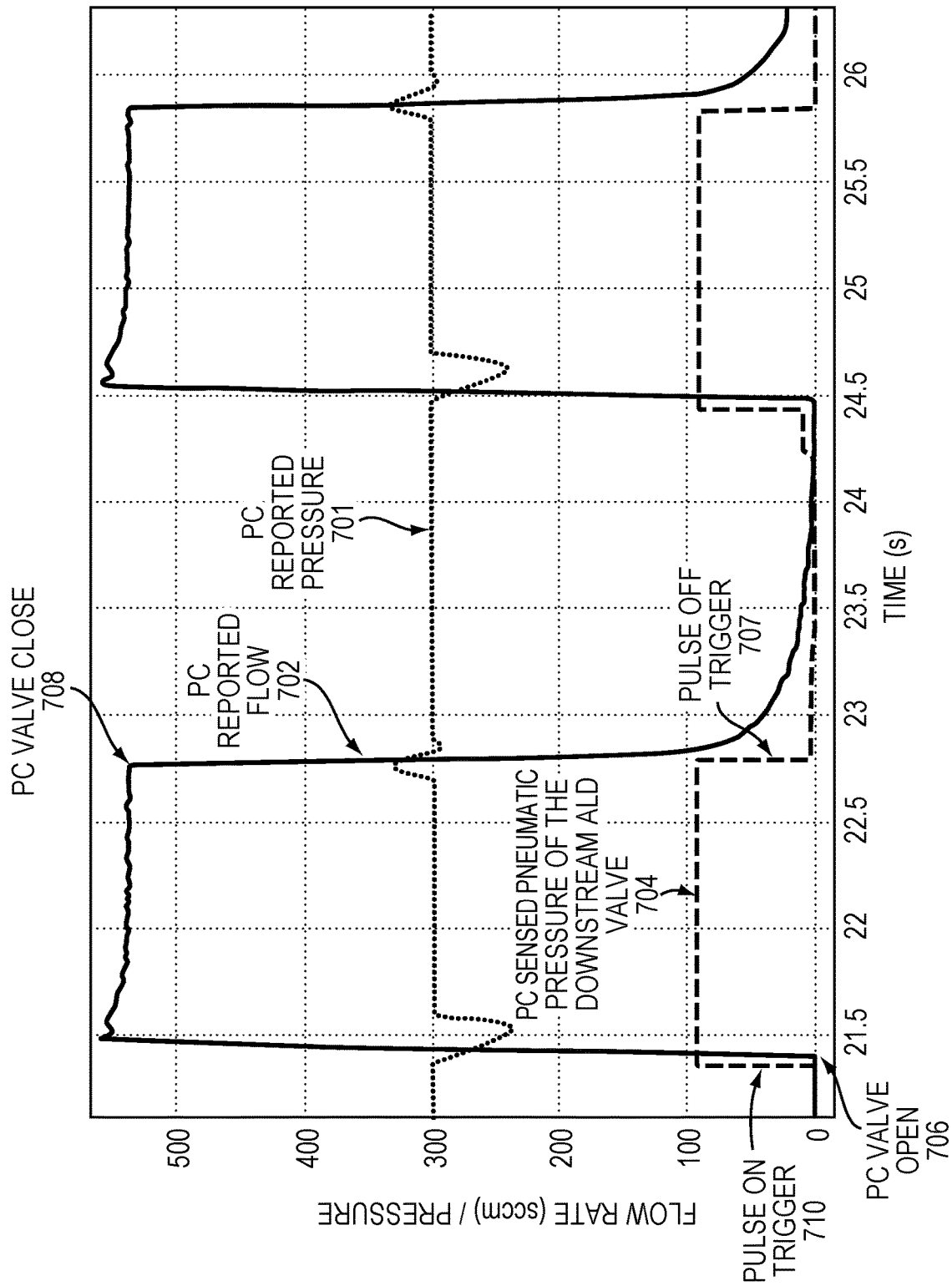
FIG. 7 is a graph illustrating operation of a gas delivery system using a trigger input to transition between gain schedules of a pressure controller.

The trigger signal conveyed by the pressure sensor 590 to the control unit 505 can be detected when the pneumatic pressure is above a pre-determined threshold on the rising edge for the downstream shutoff valve to be opened. An example pneumatic control pressure signal is illustrated in FIG. 7 at 704, described below. Optionally, a flow sensor (not shown) may be included in the pressure controller 510 to measure flow through the flow channel 515. The flow sensor can be used for diagnostic purposes, for example by detecting a change in flow that may indicate a leak or an obstruction in the flow channel 515.

The fluid delivery systems illustrated in FIGS. 4A, 4B and 5 can provide a gas delivery solution that can retrofit into existing process tools (e.g., the system 100 of FIG. 1) with minimum software and hardware change. For example, the host controller need not be configured to send a trigger signal to the pressure controller to cause the pressure controller to adjust a pressure gain. Further, multiple pressure controllers with respective downstream valves can be arranged for multiplexing, as may be required by certain processes. The systems can also use the pressure controller to purge the system, e.g., the flow channel or the process chamber. To purge, the pressure controller may be instructed with a valve open command, causing maximum opening of the control valve.

An existing system having an external shutoff valve, such as shown in FIG. 1, can be retrofitted with an improved pressure controller, such as the pressure controllers 410, 510 (FIGS. 4A, 4B, 5), to control flow through the control valve in response to an input from a downstream shutoff valve to provide improved pressure control using the method described herein. The improved pressure controller would not simply control pressure within the flow channel, as in a standard pressure controller, but would adjust the pressure control parameters in accordance with an optimal gain schedule in response to a trigger input indicating the state of the shutoff valve. The host controller may specify the pressure set point and the parameters of the gain schedules to be operated by the pressure controller. In response, the pressure controller may operate to maintain pressure within the fluid channel in accordance with multiple different gain schedules, and may transition between the different gain schedules in response to a trigger signal received at the trigger input of the pressure controller.

Figure 6:
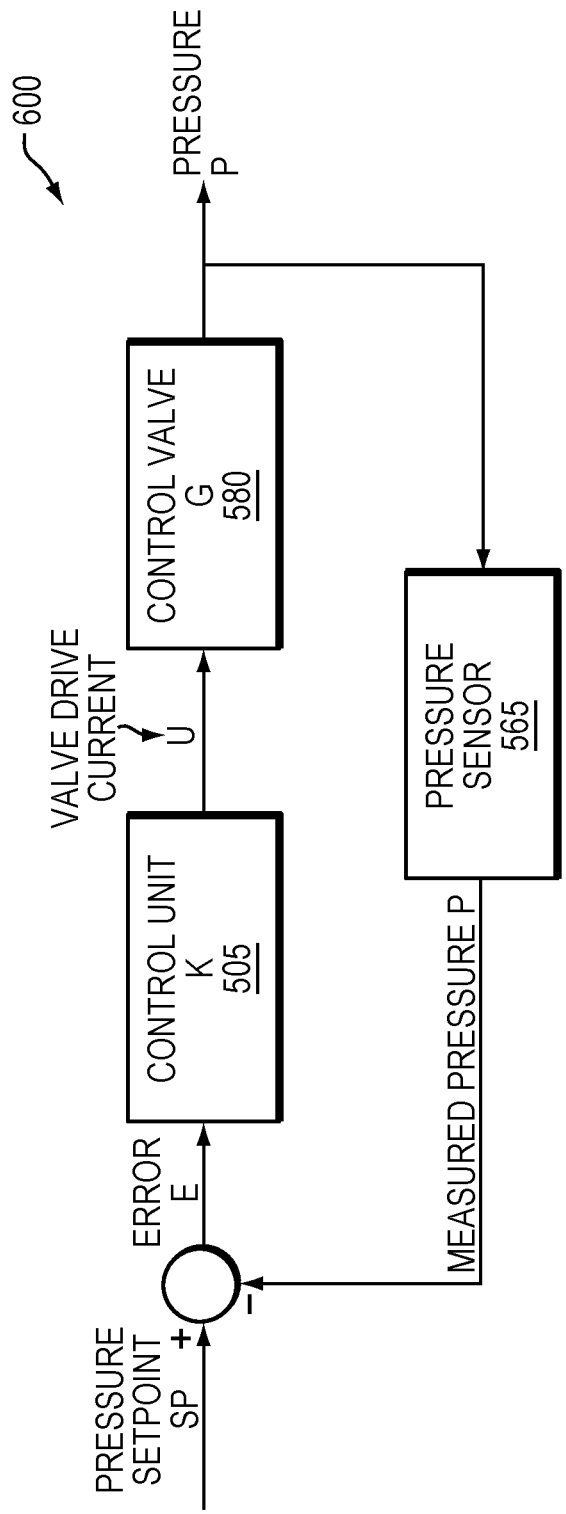
FIG. 6 is a block diagram of a control loop that may be operated by a pressure controller in one embodiment.

FIG. 6 is a block diagram of a control loop 600 that may be operated by a pressure controller in one embodiment. With reference to the pressure controller 510 of FIG. 5, the control unit 505 issues a valve drive current U to the control valve 580 to control the degree to which the control valve 580 is open. This control varies the quantity of gas transferred from the gas source to the flow channel 515, thereby controlling the gas pressure P within the flow channel 515. The pressure sensor 565 measures the gas pressure P, which is compared against the setpoint pressure SP to provide an error value E (E=SP−P).

The control unit 505, in turn, implements the error value E to adjust the valve drive current U to move the gas pressure P toward the pressure setpoint SP. Further, the control unit 505 may determine the valve drive current U based on one or more gain parameters that make up a gain schedule or control gain set. For example, a control gain set may include the values $k_p$, $k_i$, $k_d$, wherein $k_p$ is the proportional control gain; $k_i$ is the integral control gain and $k_d$ is the derivative control gain. If the control unit 505 is a proportional-integral-derivative (PID) controller, then, implementing such a control gain set, the control unit 505 may determine the valve drive current U as follows:

$$U = k_p \cdot E + k_i \cdot \int_{-\infty}^{t} E dT + k_d \cdot \frac{dE}{dt} \quad (1)$$

The control unit 505 may store multiple control gain sets to an internal data storage (not shown), wherein each control gain set indicates the control gain values ($k_p$, $k_i$, $k_d$) used to determine a value of the control signal (e.g., direct drive current U). Each of the control gain sets may correspond to a respective gain schedule. Thus, in response to receiving a trigger signal such as the trigger signal applied to a shutoff valve downstream from the control valve as described above, the control unit 505 can transition from a first gain schedule to a second gain schedule. The second gain schedule may comprise control gain values that enable the pressure controller 510 to achieve improved pressure control in comparison to the first gain schedule when the downstream shutoff valve is in the given state (open or closed). For example, the second gain schedule may have higher control gains than those of the first gain schedule for the pressure controller to improve handling of disturbance rejection situations (e.g., sudden pressure drop due to the open of the shutoff valve). However, the second gain schedule may not be as effective as the first gain schedule for steady state pressure control (when the shutoff valve is closed) because the higher control gain may contribute to instability of the steady state pressure feedback control loop.

Gain schedules may differ in all three of the PID control gains or in only one or two of the control gains. In a non-PID controller, a schedule may include only a single or more control gains.

FIG. 7 illustrates operation of a gas delivery system using a trigger input to transition between gain schedules of a pressure controller. With reference to FIG. 5, the measured pressure 701 and the measured flow rate 702 as reported by the pressure controller 510 are plotted as function of time.

Also plotted is the pressure 704 of the downstream shutoff valve 130 as sensed by the pressure sensor 590 of the pressure controller 510. At 706, the pressure controller 510 may transition from a first gain schedule to a second gain schedule in response to a step in the pressure signal 704 indicative of opening of the downstream valve 130. The increase in pressure signal 704 above a threshold value is the pulse on trigger 710 for the pressure controller 510 to undergo this transition. As the downstream shutoff valve is opened to deliver the gas pulse, the measured pressure 701 drops. The second gain schedule with high gain settings quickly regulate the pressure 701 back to the pressure setpoint. When the pulse gas delivery is finished and the shutoff valve is closed, the pressure signal 704 decreases and falls below a threshold value. The falling edge of pressure signal 704 below the threshold is the pulse off trigger 707 for the pressure controller 510 to switch from the second gain schedule to the first gain schedule. The pressure controller 510 regulates the pressure 701 to the pressure setpoint using the first control gain schedule. At 708, the openness of the control valve decreases, causing the reported flow 702 to quickly drop.

Figure 8:
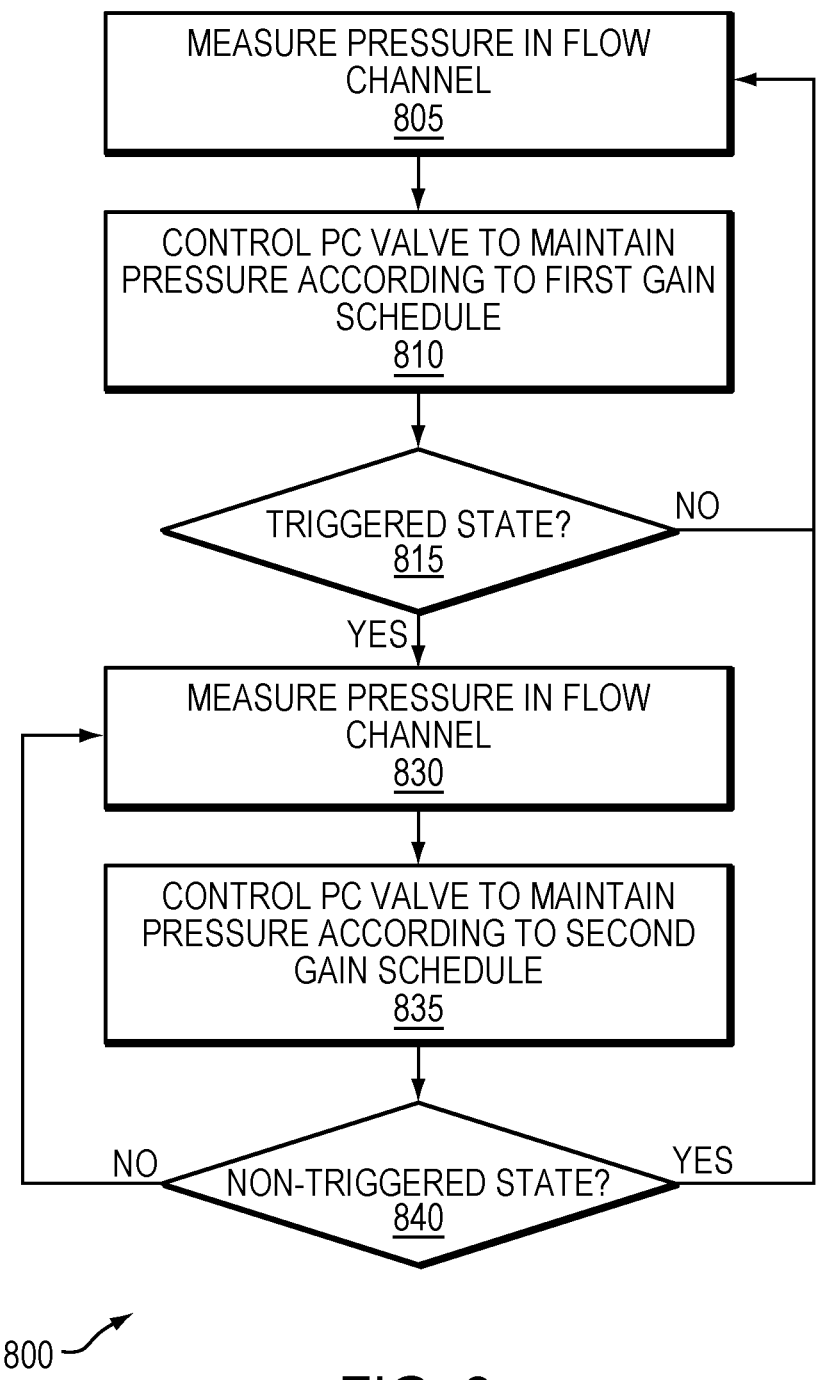
FIG. 8 is a flow diagram of a method of controlling pressure in one embodiment.

FIG. 8 is a flow diagram of a process 800 of controlling pressure in one embodiment. With reference to FIG. 5, during normal operation and when a downstream shutoff valve 130 (FIG. 4A) is closed, the pressure controller 510 may operate under steady-state control conditions to maintain gas pressure in the flow channel 515. To do so, the pressure controller 510 may measure pressure in the flow channel 805 via the downstream pressure sensor 565 (805), and then, based on this measurement, control the control valve 580 to maintain pressure according to a first gain schedule (810). This measurement and control process may be carried out via the pressure control loop described above with reference to FIG. 6. The first gain schedule may be optimized for steady-state control of the pressure when the shutoff valve is closed, for example by specifying the control gain values ($k_p$, $k_i$, $k_d$) used to determine a value of the control signal to the control valve 580.

The pressure controller 510 may continuously or periodically sense a trigger input at the control unit 505 for the presence of a trigger signal (e.g., via the external pressure sensor 590) (815). If no such signal is present, the pressure controller 510 may continue the steady-state control operation under the first gain schedule. However, if the control unit 505 detects a triggered state (e.g., indicating that the downstream shutoff valve is open), the pressure controller may transition from a non-triggered mode to a triggered mode. Under the triggered mode, the pressure controller 510 may measure pressure in the flow channel 805 via the downstream pressure sensor 565 (830), and then, based on this measurement, control the control valve 580 to maintain pressure according to a second gain schedule (835). This measurement and control process may be carried out via the pressure control loop described above with reference to FIG. 6. The second gain schedule may be optimized for disturbance rejection when the shutoff valve is open, for example by specifying the control gain values ($k_p$, $k_i$, $k_d$) used to determine a value of the control signal to the control valve 580. The pressure controller 510 may continue the disturbance rejection operation under the second gain schedule until the control unit 505 detects a non-triggered state (e.g., indicating that the downstream shutoff valve is closed) (840). In response, the pressure controller may transition back to the non-triggered mode under the first gain schedule (805, 810).

While example embodiments have been particularly shown and described, it will be understood by those skilled in the art that various changes in form and details may be made therein without departing from the scope of the embodiments encompassed by the appended claims.

What is claimed is:

1. A gas delivery system comprising:
a flow channel;
a control valve configured to control flow of gas in the flow channel;
a downstream pressure sensor, downstream of the control valve, configured to measure gas pressure in the flow channel; and
a control unit having an external trigger input configured to receive a trigger signal applied to a shutoff valve downstream from the control valve, the control unit configured for separate modes of operation based on a state of the trigger signal, the separate modes of operation including:
a non-triggered mode in which the control unit is configured to control pressure at the downstream pressure sensor via the control valve in accordance with a first gain schedule; and
a triggered mode in which the control unit is configured to control the pressure at the downstream pressure sensor via the control valve in accordance with a second gain schedule distinct from the first gain schedule.

2. The gas delivery system of claim 1 wherein the trigger input includes a trigger pressure sensor configured to determine the state of the trigger signal based on pressure at the trigger input.

3. The gas delivery system of claim 2 wherein the trigger input taps a pneumatic line that opens and closes the shutoff valve, the trigger pressure sensor configured to sense pressure at the pneumatic line.

4. The gas delivery system of claim 3 wherein the trigger input taps the pneumatic line between a pneumatic control valve and the shutoff valve.

5. The gas delivery system of claim 2 wherein the trigger pressure sensor receives the trigger signal via a pneumatic line controlled by a host controller.

6. The gas delivery system of claim 1 wherein the trigger signal is an electrical signal indicating an open or close state of the shutoff valve.

7. The gas delivery system of claim 1 wherein each of the first and second gain schedules has gain parameters including at least one of a proportional control gain, an integral control gain, and a derivative control gain.

8. The gas delivery system of claim 1 wherein the control unit, in the triggered and non-triggered modes, controls pressure at the downstream pressure sensor based on a comparison of the measured pressure against a setpoint pressure.

9. The gas delivery system of claim 1 further comprising a host controller configured to control the shutoff valve to deliver a pulse of gas flow through the flow channel.

10. The gas delivery system of claim 9 wherein the triggered mode corresponds to delivery of the pulse of gas flow and the non-triggered mode corresponds to an absence of the delivery of the pulse of gas flow.

11. A method of gas delivery comprising:
providing a control valve configured to control flow of gas in a flow channel and a downstream pressure sensor, downstream of the control valve, configured to measure gas pressure in the flow channel; and
with a control unit having an external trigger input configured to receive a trigger signal applied to a shutoff valve downstream from the control valve, controlling the control valve in separate modes of operation, based on a state of the trigger signal, including:
a non-triggered mode in which pressure at the downstream pressure sensor is controlled via the control valve in accordance with a first gain schedule; and
a triggered mode in which the pressure at the downstream pressure sensor is controlled via the control valve in accordance with a second gain schedule distinct from the first gain schedule.

12. The method of claim 11 further comprising determining the state of the trigger signal based on pressure at the trigger input.

13. The method of claim 12 wherein determining the state of the trigger signal includes sensing pressure at a pneumatic line that opens and closes the shutoff valve.

14. The method of claim 13 wherein the trigger input taps the pneumatic line between a pneumatic control valve and the shutoff valve.

15. The method of claim 12 further comprising receiving the trigger signal via a pneumatic line controlled by a host controller.

16. The method of claim 11 wherein the trigger signal is an electrical signal indicating an open or close state of the shutoff valve.

17. The method of claim 11 wherein each of the first and second gain schedules has gain parameters including at least one of a proportional control gain, an integral control gain, and a derivative control gain.

18. The method of claim 11 further comprising, in the triggered and non-triggered modes, controlling pressure at the downstream pressure sensor based on a comparison of the measured pressure against a setpoint pressure.

19. The method of claim 11 further comprising controlling the shutoff valve to deliver a pulse of gas flow through the flow channel.

20. The method of claim 19 wherein the triggered mode corresponds to delivery of the pulse of gas flow and the non-triggered mode corresponds to an absence of the delivery of the pulse of gas flow.

21. A pressure controller comprising:
as an integral assembly,
a flow channel;
a control valve configured to control flow of gas in the flow channel;
a downstream pressure sensor, downstream of the control valve, configured to measure gas pressure in the flow channel; and
a control unit having an external trigger input configured to receive a trigger signal applied to a shutoff valve downstream from the control valve, the control unit configured for separate modes of operation based on a state of the trigger signal, the separate modes of operation including:
a non-triggered mode in which the control unit is configured to control pressure at the downstream pressure sensor via the control valve in accordance with a first gain schedule; and
a triggered mode in which the control unit is configured to control the pressure at the downstream pressure sensor via the control valve in accordance with a second gain schedule distinct from the first gain schedule.

22. The pressure controller of claim 21 wherein the trigger input includes a trigger pressure sensor configured to determine the state of the trigger signal based on pressure at the trigger input.

23. The pressure controller of claim 21 wherein the trigger signal is an electrical signal indicating an open or close state of the shutoff valve.

24. The pressure controller of claim 21 wherein each of the first and second gain schedules has gain parameters including at least one of a proportional control gain, an integral control gain, and a derivative control gain.

* * * * *